United States Patent
Clarke et al.

(10) Patent No.: US 10,402,045 B2
(45) Date of Patent: Sep. 3, 2019

(54) CONTROLLING AN IMAGE DISPLAYED ON A USER INTERFACE OF A COMPUTER DEVICE

(71) Applicant: KING.COM LIMITED, St. Julians (MT)

(72) Inventors: Tristan Clarke, London (GB); Jakub Slaby, London (GB)

(73) Assignee: KING.COM LTD., St. Julians (MT)

( * ) Notice: Subject to any disclaimer, the term of this patent is extended or adjusted under 35 U.S.C. 154(b) by 61 days.

(21) Appl. No.: 14/962,571

(22) Filed: Dec. 8, 2015

(65) Prior Publication Data

US 2017/0161870 A1    Jun. 8, 2017

(51) Int. Cl.
| | | |
|---|---|---|
| G06F 3/0481 | (2013.01) | |
| G06F 3/0484 | (2013.01) | |
| G06F 3/0488 | (2013.01) | |
| G06T 3/40 | (2006.01) | |
| G06T 13/00 | (2011.01) | |
| A63F 13/45 | (2014.01) | |

(52) U.S. Cl.
CPC .......... G06F 3/04817 (2013.01); A63F 13/45 (2014.09); G06F 3/0488 (2013.01); G06F 3/04845 (2013.01); G06T 13/00 (2013.01)

(58) Field of Classification Search
CPC .... E02F 3/283; E02F 9/0841; G06F 3/04817; G06F 3/04845; G06F 3/0488; G06T 2200/24; G06T 3/40
See application file for complete search history.

(56) References Cited

U.S. PATENT DOCUMENTS

| | | | | |
|---|---|---|---|---|
| 2005/0219264 A1* | 10/2005 | Shum | .................... | G06T 15/205 345/629 |
| 2006/0125799 A1* | 6/2006 | Hillis | ...................... | G06F 3/011 345/173 |
| 2011/0291934 A1* | 12/2011 | Yang | ..................... | G06F 3/0414 345/168 |
| 2017/0052692 A1* | 2/2017 | Ishikawa | ............... | G06F 3/0488 |

OTHER PUBLICATIONS

PhotoSwipe, Wayde Wyatt, video "Photo Swipe", Published on Jun. 30, 2014. https://www.youtube.com/watch?v=3s1ffrhMbZY.*
PhotoSwipe Options; Dec. 25, 2014; https://web.archive.org/web/20141225201828/http://photoswipe.com/documentation/options.html.*
InDesign Help / Ruler guides; Jan. 28, 2014; https://web.archive.org/web/20140128112112/https://helpx.adobe.com/indesign/using/ruler-guides.html.*
YouTube video: "Training Games Panorama Slides", Published on Feb. 9, 2015. https://www.youtube.com/watch?v=z9m_XDzslZo.*
YouTube video: "Looking through Peephole number 11", Published on Jul. 11, 2011. https://www.youtube.com/watch?v=UXbb9VWolQg.*

* cited by examiner

*Primary Examiner* — Sing-Wai Wu
(74) *Attorney, Agent, or Firm* — Saul Ewing Arnstein & Lehr LLP

(57) ABSTRACT

A computer device has a display and a user interface which receives user input. A processor receives data representing the user input. The processor controls the display to transition from displaying a first image to displaying a second image. When there is no longer a user input and the transition has not been completed, the processor determines which of the first and second images is to be displayed.

15 Claims, 16 Drawing Sheets

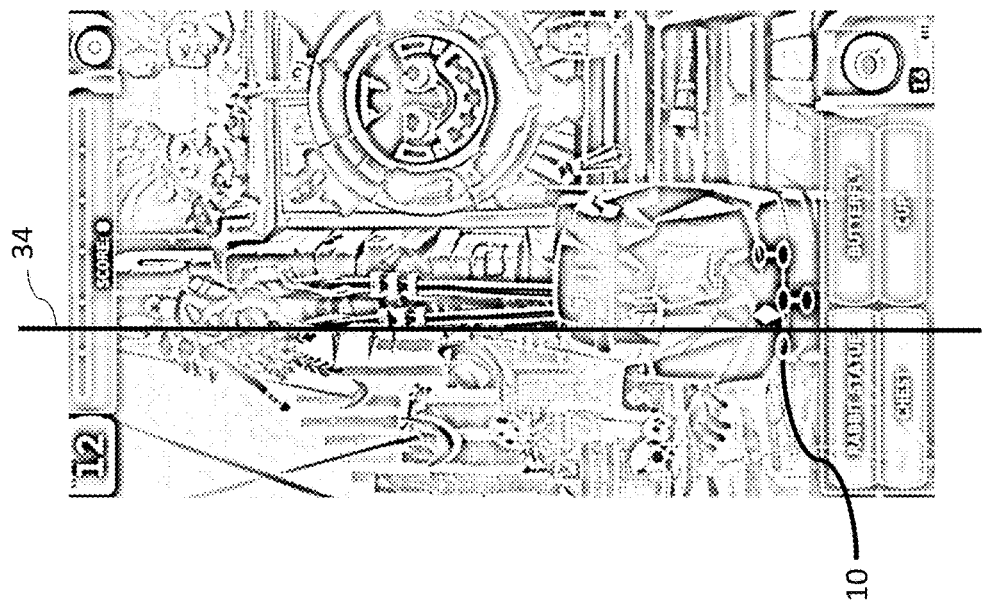
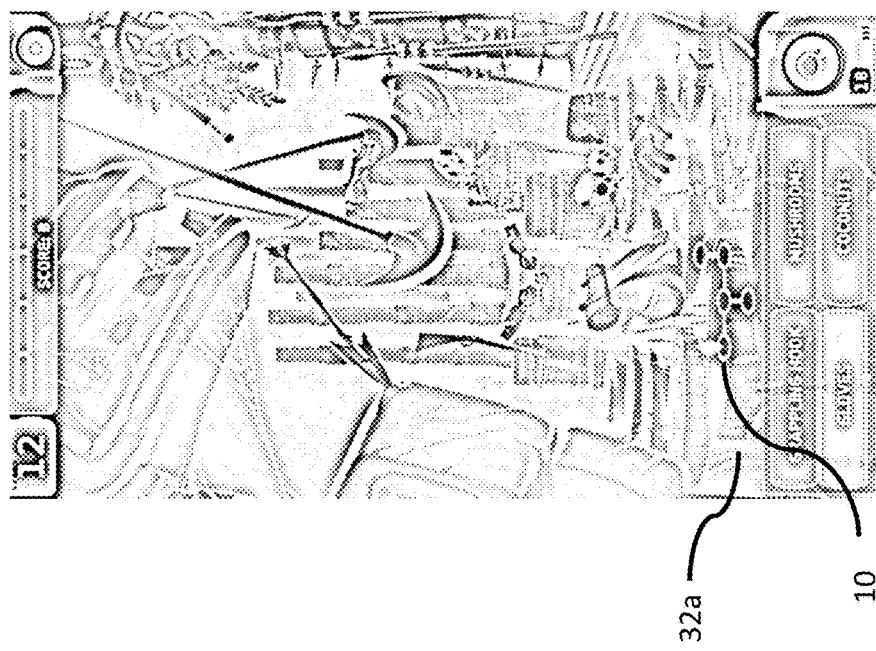

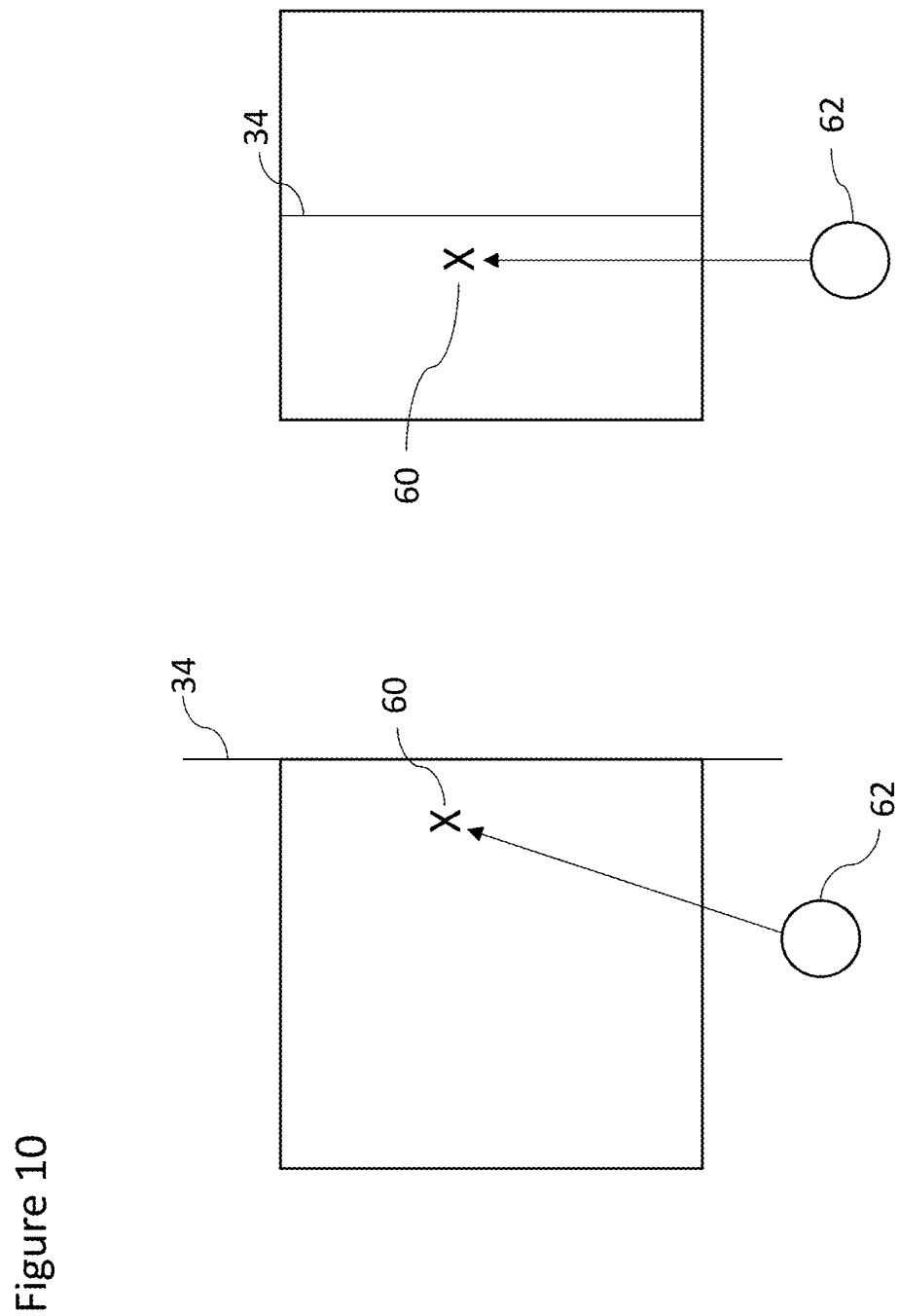

CONTROLLING AN IMAGE DISPLAYED ON A USER INTERFACE OF A COMPUTER DEVICE

FIELD OF THE INVENTION

The present application relates to controlling the image displayed on a user interface responsive to user engagement with the displayed image. The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering the image which is displayed on a user interface. This may be particular challenging when there is limited display resource available, such as when a game is being played on a smartphone, tablet or other minicomputer.

This patent specification describes not only various ideas and functions, but also their creative expression. A portion of the disclosure of this patent document therefore contains material to which a claim for copyright is made and notice is hereby given: Copyright King.com Limited 2015 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device having: a display configured to display an image; a user interface configured to receive a user input and provide data representing said user input; at least one processor configured to: receive data representing the user input; in response to receiving the data representing the user input to cause the display, which is displaying one of a first image and a second image when data representing the user input is received, to transition from displaying the one of the first image and the second image to displaying the other of the first image and the second image; determine that there is no longer a user input being received by the user input; in response to thereto, when the transition has not been completed, to determine which of the first and second images is to be displayed; and cause the display to display the determined one of the first and second images.

The at least one processor may be configured in the determining which of the first and second images is to be displayed, to determine if a condition has been met, and if so to cause one of the first and second images to be displayed.

The condition may comprise one or more of: the data representing the user input indicates that the user input comprises a movement greater or less than a given amount; more of one image is displayed than the other; and a reference associated with one of the first and second images reaching a defined location.

The reference may comprise a notional point or line with respect to one of the first and second images and the defined location may be defined with respect to display.

The display and the user interface may be provided by a touch screen, wherein user input is provided by contact with the touch screen.

The method may comprise, in response to a movement in a direction across the display to cause the image displayed on the display to transition in the direction.

During the transition, the at least one processor may be configured to cause the display to display decreasing proportions of one image and increasing proportions of the other image.

The at least one processor may be configured to render at least one or more objects in at least one of the first and second images from a viewpoint, such that the rendering of a respective object changes during the transition.

According to another aspect, there is provided a computer device having: a display configured to display an image; a user interface configured to receive a user input and provide data representing said user input; at least one processor configured to: receive data representing the user input; in response to receiving the data representing the user input to cause the display, which is displaying a first image having a target when the user input is received, to display a plurality of successive images dependent on the first image, the images being such that the target appears to be getting closer; and responsive to a determination that a condition has been met associated with the data representing the user input, to cause the display to cause a second image, not dependent on the first image to be displayed.

The at least one processor may be configured to cause an image to be generated based on a plurality of image layers, a first layer being a foreground layer and a second layer being a background layer, at least one further intermediate layer being provided between the first and second layers.

The at least one processor is configured to generate the first image using all of the layers, and to generate at least one of the images dependent on the first image using some but not all of the layers.

One of the layers may be provided with a reference, such that when the layer with the reference is uppermost in the image, the at least one processor may be configured to then cause the second image to be displayed by the display.

The at least one processor may be configured to cause at least one successive images dependent on the first image with at least one object to be displayed, the at least one object being enlarged in at least one successive image compared to a previous image, the previous image being one of the first image and one of the at least one successive images.

The first image and the at least one successive images dependent on the first image may comprise a target and a path to the target, the at least one successive images dependent on the first image may be being rendered by the at least one processor from a view point with respect to the path.

According to another aspect, there is provided a computer implemented method comprising: displaying by a display an image; receiving user input by a user interface and providing data representing said user input; receiving data by at least one processor representing the user input; in response to receiving the data representing the user input, causing the display, which is displaying one of a first image and a second image when data representing the user input is received, to transition from displaying the one of the first image and the second image to displaying the other of the first image and the second image; determining that there is no longer a user input being received by the user input; in response to thereto, when the transition has not been completed, determining which of the first and second images is to be displayed; and causing the display to display the determined one of the first and second images.

The determining which of the first and second images is to be displayed, may comprise determining if a condition has been met, and if so causing one of the first and second images to be displayed.

The condition may comprise one or more of: the data representing the user input indicates that the user input comprises a movement greater or less than a given amount; more of one image is displayed than the other; and a reference associated with one of the first and second images reaching a defined location.

The reference may comprise a notional point or line with respect to one of the first and second images and the defined location may be defined with respect to display.

The display and the user interface may be provided by a touch screen, wherein user input is provided by contact with the touch screen.

The method may comprise, in response to a movement in a direction across the display causing the image displayed on the display to transition in the direction.

During the transition, the method may comprise to causing the display to display decreasing proportions of the one image and increasing proportions of the other image.

The method may comprise rendering at least one or more objects in at least one of the first and second images from a viewpoint, such that the rendering of a respective object changes during the transition.

According to another aspect, there is provided a computer implemented method comprising: displaying an image; receiving a user input and providing data representing said user input; receiving by a processor data representing the user input; in response to receiving the data representing the user input, causing the display, which is displaying a first image having a target when the user input is received, to display a plurality of successive images dependent on the first image, the images being such that the target appears to be getting closer; and responsive to a determination that a condition has been met associated with the data representing the user input, causing the display to display a second image, not dependent on the first image to be displayed.

The method may comprise causing an image to be generated based on a plurality of image layers, a first layer being a foreground layer and a second layer being a background layer, at least one further intermediate layer being provided between the first and second layers.

The method may comprise generating the first image using all of the layers, and to generate at least one of the images dependent on the first image using some but not all of the layers.

One of the layers may be provided with a reference, such that when the layer with the reference is uppermost in the image, the method may comprise causing the second image to be displayed by the display.

The method may comprise causing at least one successive images dependent on the first image with at least one object to be displayed, the at least one object being enlarged in at least one successive image compared to a previous image, the previous image being one of the first image and one of the at least one successive images.

The first image and the at least one successive images dependent on the first image may comprise a target and a path to the target, the method may comprise rendering the at least one successive images dependent on the first image by the at least one processor from a view point with respect to the path.

According to another aspect, there is provided a computer program product, comprising a computer readable storage device having a computer readable program code stored therein, said computer readable program code containing instructions configured to be executed by at least one processor to implement a method, said method comprising: displaying by a display an image; receiving user input by a user interface and providing data representing said user input; receiving data by at least one processor representing the user input; in response to receiving the data representing the user input, causing the display, which is displaying one of a first image and a second image when data representing the user input is received, to transition from displaying the one of the first image and the second image to displaying the other of the first image and the second image; determining that there is no longer a user input being received by the user input; in response to thereto, when the transition has not been completed, determining which of the first and second images is to be displayed; and causing the display to display the determined one of the first and second images.

The determining which of the first and second images is to be displayed, may comprise determining if a condition has been met, and if so causing one of the first and second images to be displayed.

The condition may comprise one or more of: the data representing the user input indicates that the user input comprises a movement greater or less than a given amount; more of one image is displayed than the other; and a reference associated with one of the first and second images reaching a defined location.

The reference may comprise a notional point or line with respect to one of the first and second images and the defined location may be defined with respect to display.

The display and the user interface may be provided by a touch screen, wherein user input is provided by contact with the touch screen.

The method may comprise, in response to a movement in a direction across the display causing the image displayed on the display to transition in the direction.

During the transition, the method may comprise to causing the display to display decreasing proportions of the one image and increasing proportions of the other image.

The method may comprise rendering at least one or more objects in at least one of the first and second images from a viewpoint, such that the rendering of a respective object changes during the transition.

According to another aspect, there is provided a computer program product, comprising a computer readable storage device having a computer readable program code stored therein, said computer readable program code containing instructions configured to be executed by at least one processor to implement a method, said method comprising: displaying an image; receiving a user input and providing data representing said user input; receiving by a processor data representing the user input; in response to receiving the data representing the user input, causing the display, which is displaying a first image having a target when the user input is received, to display a plurality of successive images dependent on the first image, the images being such that the target appears to be getting closer; and responsive to a determination that a condition has been met associated with the data representing the user input, causing the display to display a second image, not dependent on the first image to be displayed.

The method may comprise causing an image to be generated based on a plurality of image layers, a first layer being a foreground layer and a second layer being a background layer, at least one further intermediate layer being provided between the first and second layers.

The method may comprise generating the first image using all of the layers, and to generate at least one of the images dependent on the first image using some but not all of the layers.

One of the layers may be provided with a reference, such that when the layer with the reference is uppermost in the image, the method may comprise causing the second image to be displayed by the display.

The method may comprise causing at least one successive images dependent on the first image with at least one object to be displayed, the at least one object being enlarged in at least one successive image compared to a previous image, the previous image being one of the first image and one of the at least one successive images.

The first image and the at least one successive images dependent on the first image may comprise a target and a path to the target, the method may comprise rendering the at least one successive images dependent on the first image by the at least one processor from a view point with respect to the path.

A computer program comprising program code means adapted to perform the method(s) may also be provided. The computer program may be stored and/or otherwise embodied by means of a carrier medium.

A further aspect provides computer program products for implementing the afore-defined methods.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF THE DRAWINGS

Embodiments of the invention will now be described by way of the accompanying drawings in which:

FIGS. 6a to 6c show images as a transition is made from a first image of FIG. 6a to a second image in FIG. 6c, the first and second images being in respective first and second scenes;

FIG. 10 schematically shows a camera angle for a rendered object in an image as a transition is made from that image to another image;

DETAILED DESCRIPTION OF PREFERRED EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of example various implementations in which the invention may be utilized. It is to be understood that other implementations may be utilized, and structural and functional modifications may be made without departing from the scope of the present invention.

It should be appreciated that the different approaches to implementing the game is not exhaustive, what is described herein are certain embodiments. It is possible to provide a number of variations without departing from the scope of the invention.

Figure 1:
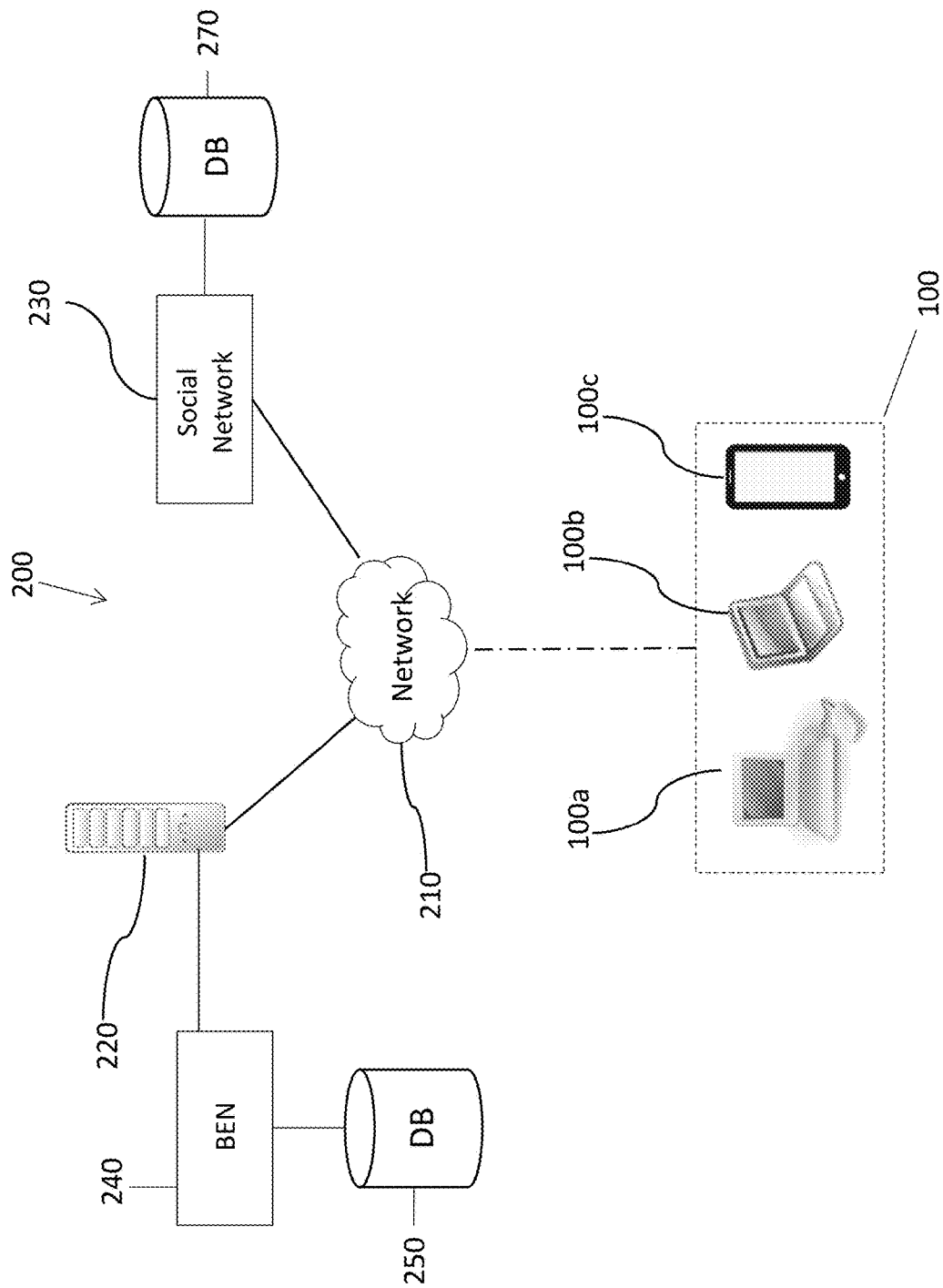
FIG. 1 shows an example system in which some embodiments may be provided.
Figure 2:
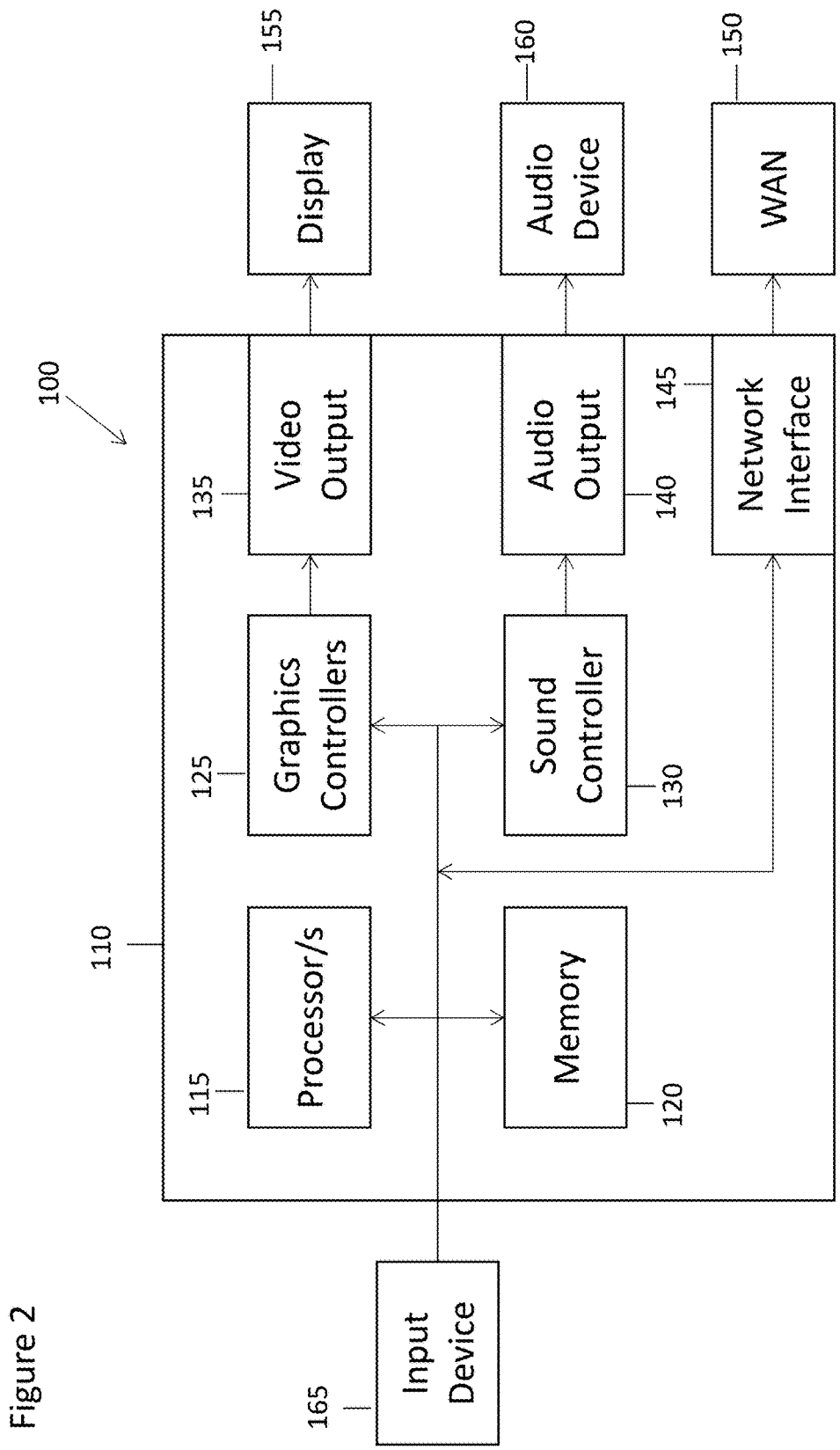
FIG. 2 shows an example user device in which some embodiments may be provided.

A schematic view of a user device 100 according to an embodiment is shown in FIG. 2. All of the blocks shown are implemented by suitable circuitry. The blocks may be implemented in hardware and/or software. The user device may have a control part 110. The control part 110 is also shown as having a graphics controller 125 and a sound controller 130. It should be appreciated that one or other or both of the graphics controller 125 and sound controller 130 may be provided by the one or more processors 115.

The graphics controller 125 is configured to provide a video output 135. The sound controller 130 is configured to provide an audio output 140. The controller 110 has an interface 145 allowing the device to be able to communicate with a network 150 such as the Internet or other communication infrastructure.

The video output 135 is provided to a display 155. The audio out 140 is provided to an audio device 160 such as a speaker and or earphone(s).

The device 100 has an input device 165. The input device can take any suitable format and can be one or more of a keyboard, mouse, touch screen, joystick or game controller. It should be appreciated that the display 155 may in some embodiments also provide the input device 165 by way of an integrated touch screen for example. In some embodiments, the display is a touch screen allowing the user to interact with the displayed image.

The blocks of the controller 110 are configured to communicate with each other by an interconnect such as a bus or any other suitable interconnect and/or by point to point communication.

It should be appreciated that in some embodiments, the controller may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

FIG. 2 schematically shows a system 200 according to an embodiment. The system 200 comprises a server 220 which may store or be in communication with database 250 which may be, in some embodiments, be connected to a back end infrastructure (BEN) of game player's details, profiles, statistics etc. In practice, one or more databases 250 may be provided. Where more than one server 220 is provided, the database(s) 250 may be provided in one database 250 or across two or more servers. The server 220 may also have a games data function. This may comprise one or more units of memory to store the computer game program, user behaviour data and a processor 115 to run the games program and process the user behaviour data.

The server 220 may communicate via, for instance, the internet 210 to one or more client or user devices 100, shown in FIG. 2 by way of example as user devices 100a, 100b and 100c, and may further provide connections to a social network 230, for example, Facebook™. The social network 230 may also be connected to a database 270 storing social user interaction details, for instance, user to user interaction maps, friend lists, location history etc. In practice, one or more databases 270 may be provided.

It should be appreciated that embodiments may be deployed in different system architectures. For example, the computer game may be implemented as a computer game that is stored in the at least one memory of the user device and is run on the processor(s) of the user device. However, the server 320 may handle some elements of the game in some embodiments. By way of example only, a Java game applet may be provided to the user device 200 and the locally running Java applet will generate, for example, the graphics, sounds, and user interaction for the game play on the user device. Some data may be fed back to the server to allow interaction with other players 305. The data which is fed back may alternatively or additionally allow scoring and/or cross platform synchronization.

In some embodiments, the game may be implemented as a computer program that is stored in at least one memory of the system, for example the server, and which runs on a processor(s) of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

It should be appreciated that some embodiments may be provided as stand-alone games on the user device.

Figure 3:
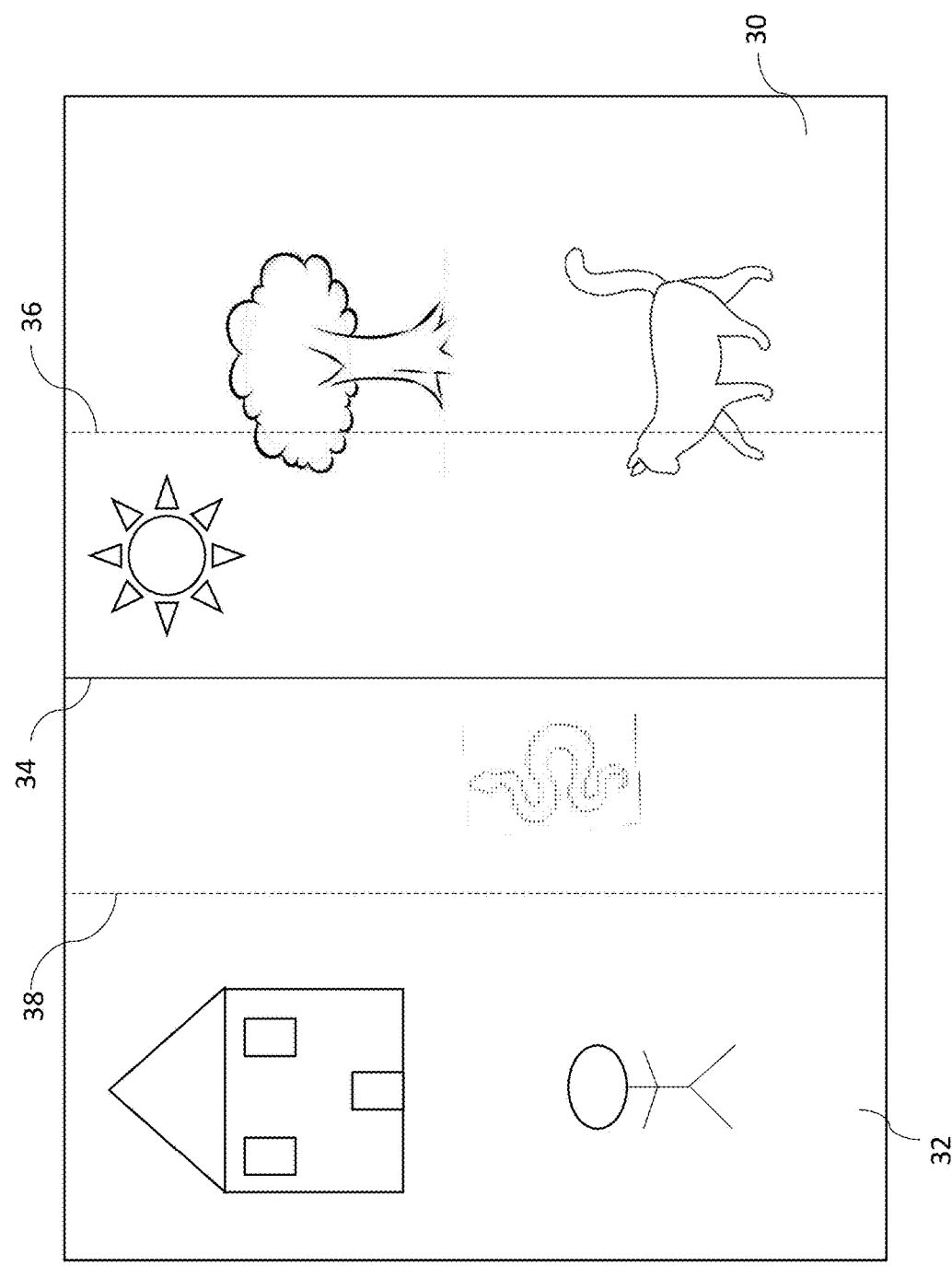
FIG. 3 schematically shows an example of a first image and a second image of a scene, arranged side by side.
Figure 6C:
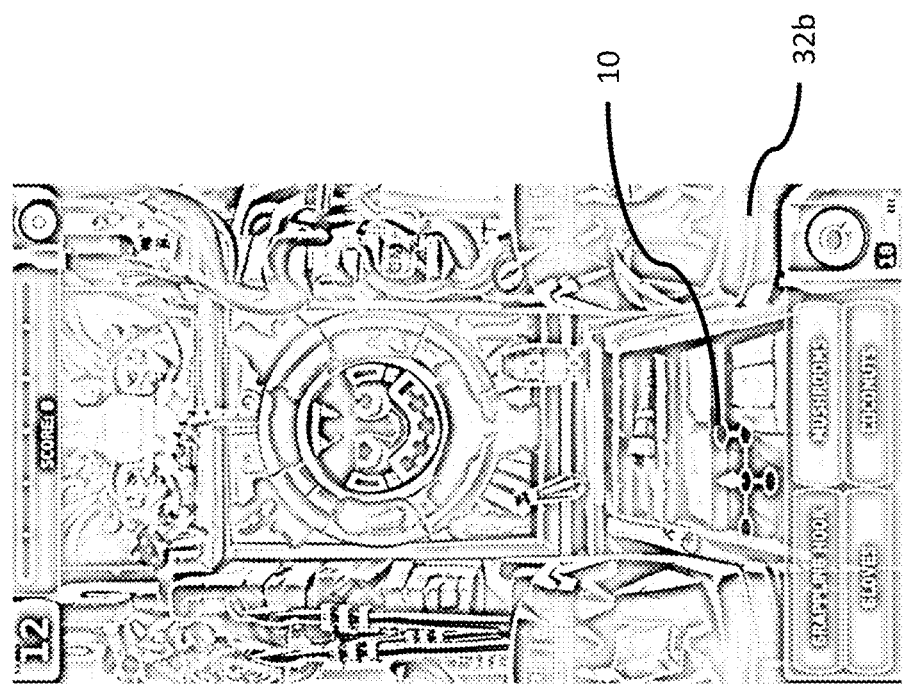

Reference is made to FIG. 3 in conjunction with FIGS. 6a, 6b, and 6c.

In some embodiments, a first image 32 is displayed on the touch screen display of the device. A second image 30 can the subsequently displayed on the device 30. In the case of FIG. 3, the two images will be part of the same scene. In the example shown in FIGS. 6a and c, the two images are of different scenes. In embodiments, it is desirable to allow the user to use their finger to move or transition between the two images, which are side by side.

In the example shown in FIG. 3, a user will drag their finger from right to left in order to move from the image referenced 32 to the image or scene referenced 30. The delimiter or boundary between the two images or scene is referenced 34. This delimiter or boundary may be displayed. However, in other embodiments, this boundary or delimiter is a notional boundary or delimiter and is not displayed. As the user starts moving their finger from right to left across the display, increasingly less of the image 32 is displayed and increasingly more of the image 30 is displayed.

In this regard, reference is made to FIGS. 6a to 6c. FIGS. 6a to c show the images which are displayed on the display of the device as the user moves his finger across the display. FIG. 6a shows a first image 32a. As the user moves his finger from right to left across the display, the user will eventually be shown the image shown in FIG. 6c which shows the second image 30a. The transition from the first to the second image is completed when only the second image is displayed. FIG. 6b shows the image on the display where the user has moved his finger from right to left across the display so that the transition between the first and second images is midway through. Thus, the user is able to see on the display the right hand part of the first image 32a and the left-hand part of the second image 30a. The boundary between the images is shown in FIG. 6b and is also referenced 34. Again, this boundary may be a notional boundary.

In some embodiments, when a user removes their finger from the touch screen display, before the transition has been completed, it is arranged so that either the first image 32 only or the second image 30 only is displayed. Accordingly, the intermediate image such as shown in FIG. 6b is only displayed if the finger of the user is still in contact with the touch screen display.

It should be appreciated that data defining the images may be stored in a memory. This data is used by the graphics engine or processor when rendering the image to be displayed on the display. The data may be stored in any suitable format. In some embodiments, the data may be stored in a compressed format. In other embodiments, at least some of the data defining an image may be stored as a bitmap.

In some embodiments, the data for an image to be displayed is stored as a respective set of data. This would be the data for the first and second images in the above discussion, for example.

In some embodiments, some data for different displayed images, may be shared and is used when a respective one of the images is rendered.

In some embodiments, a set of data is stored and from that set of data the first image and the second image may rendered. For example, the set of data may represent a scene. More than two images may be provided by the set of data in some embodiments.

In other embodiments, the data for a given image may be stored as part of a first set of data and part of a second set of data. In some embodiments, there may be more than two sets of data which is used to render a given image.

Figure 8:
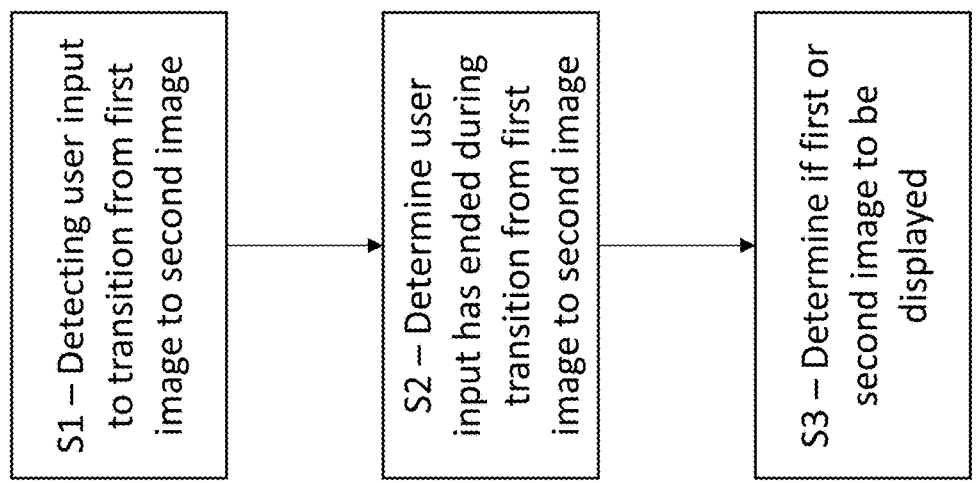
FIG. 8 shows a method of an embodiment.

In this regard, reference is made to the FIG. 8. This shows a method used in some embodiments.

In step S1, a user input is detected. In some embodiments, the user input will be the user putting their finger on the screen and dragging their finger across the screen in a left or right direction. In some embodiments, the user can generally touch the screen anywhere on the displayed image. It should be appreciated that other types of movement may alternatively be used to move between the images or scenes. The user interface with thus provide electronic data as an output in response to the user input. Electronic data representing the user input may be provided, for example to a processor of the computer device or user device. The electronic data output by the touch screen or user input device may be processed prior to being provided to the processor or in other embodiments may be directly provided to the processor. Thus the processor will receive electronic data representative of the user input directly or indirectly from the user interface.

In step S2, a determination is made that the user input has ended. This will be when, for example, the user has removed their finger from the touch screen and accordingly, there is no user input. The processor may make the determination that on the basis that the electronic data representing the user input is no longer received. As the user moves their finger across the screen, the electronic data representing the user input provided by the user interface to the processor will provide information associated with the position of the user's fingers as it moves. If the user's finger is not moving, the electronic data representing the position of the user's finger on the display will be provided to the processor. When the user removes their finger, there will be no data representing a position on the display provided to the processor. This may be used by the processor to determine that the user input has ended, i.e. that the user is no longer touching the touch screen.

In step S3, it is determined if the first or second image is to be displayed, in the case that the transition when moving from the first image to the second image has not been completed. In this scenario, the display will show part of the first image and part of the second image. The determination may be done is any suitable way. The determination will be performed by the processor.

In one embodiment, it is determined by the processor from the data representing the user input how far the user has moved their finger between the initial contact with the display to the last point of contact with the display. In other words how much distance has the user's finger moved relative the display is determined by the processor. The distance may be determined from the electronic data representing the user input. This distance may be compared to a threshold distance by the processor. This threshold distance may be stored in a memory. If the distance is above the threshold, the second image is displayed. If the distance is below the threshold, the first image may be displayed. If the distance is at the threshold, in some embodiments, the second image is displayed. In other embodiments, if the distance is at the threshold, the first image may be displayed. In some embodiments, if the distance is at the threshold, the image will default to the image which is displayed at the beginning of the transition.

In another embodiment, the processor may be configured to determine if more of one image than the other is displayed, when the user input ends. The image displayed will be that image which has more of it displayed. If the two images are displayed in equal amounts, the image displayed in some embodiments will be the first image and in other embodiments will be the second image.

Another embodiment for determining if the first or second image is to be displayed is described with reference to FIG. 3. Shown on FIG. 3 are dotted lines 38 and 36. Dotted line 38 shown with respect to the first image, is parallel to the boundary 34 between the first and second images. Likewise, line 36 shown with respect to the second image parallel to the boundary 34. Data defining these notional lines may be stored in memory. The data associated with the boundary line may be stored with the respective image data in some embodiments.

The boundary line is associated with the image (although this boundary line may not be displayed in the display) whereas lines 38 and 36 are notional lines associated with the display. As the user moves his finger from right to left across the display when the first image is displayed, the image boundary 34 moves across the screen from right to left. The line 38 represents a position on the screen and accordingly does not move with the image boundary. Where the when the image boundary 34 is on the right of that line 38 and the user removes their finger, the image which is display will revert to the first image. When the image boundary 34 is on the on the left-hand side of the line 38, when the user removes their finger, then the image which is displayed will be the second image. Similarly, the line 36 is used when the second image 30 is displayed and the user moves their finger from left to right across the screen. When the boundary is on the left-hand side of the line 36, when the user releases their finger, the second image is displayed. On the other hand, if the boundary 34 is to the right of the line 36, then the image which is displayed is the first image.

In some embodiments, a different notional line may be used when moving from right to left as compared to when moving left to right. In other embodiments a common notional line may be used. Different image may be associated with different notional line positions.

In some embodiments, a notional line is not used. Instead a determination may be made of the position of a reference point or line of the image with respect to the displayed image. Depending on the position of the reference point or line when the user input ends, will determine which of the first and second images is displayed. In some embodiments, the reference point or line may be the boundary between the images or any other suitable reference point. In some embodiments, Cartesian or other suitable coordinates may be determined.

In other embodiments, a reference may be embedded in each image. In some embodiments, the reference may be stored as part of the image data in memory. In some embodiments, the reference may alternatively be separately stored from the image data, again in memory. This reference may or may not be displayed but will be associated with a position in the image. The processor may be configured to determine when the reference is no longer displayed or the reference has reached a particular location. When that occurs, the processor is configured to select the other image as the image to be displayed. In some embodiments, the reference may be a reference point, line or area. In some embodiments, the same reference is provided in each image. In other embodiments, the references may be selected so as to weight the selection of one image over the other.

It should be appreciated that embodiments have described moving effectively between left and right. Different embodiments may of course provide movement in a vertical direction where the two scenes are vertically arranged.

In some embodiments, it is desirable to allow the user to move from one scene to another scene which is appears to be a movement in the direction into or out of the screen. It is desirable to cause the images which are displayed to be such so that creates the impression to the user that they are moving through the image displayed to another scene.

Reference is made to FIG. 5 and FIGS. 4a to c. As can be seen from FIG. 4a to c, the image has opening 36 which appears to be towards the back of the scene displayed. In order for a user to get 'through' the opening 36, the user will move his finger in a direction which caused a plurality of successive of images to be displayed, each appearing to take the user closer to the opening 36. In the example shown in FIGS. 4a to 4c, three different images are shown. In some embodiments, many more images than that shown will be provided to convey to the user the feeling of moving through the scene. The speed of the movement through the scene, i.e. the rate at which successive images are displayed, will be controlled by the user's finger. In some embodiments, to move "into" the image will require the user to move their finger in a downward direction with respect to the display.

Figure 4B:
FIGS. 4a to 4c show images of a scene displayed as a user zooms into a scene.
Figure 4A:
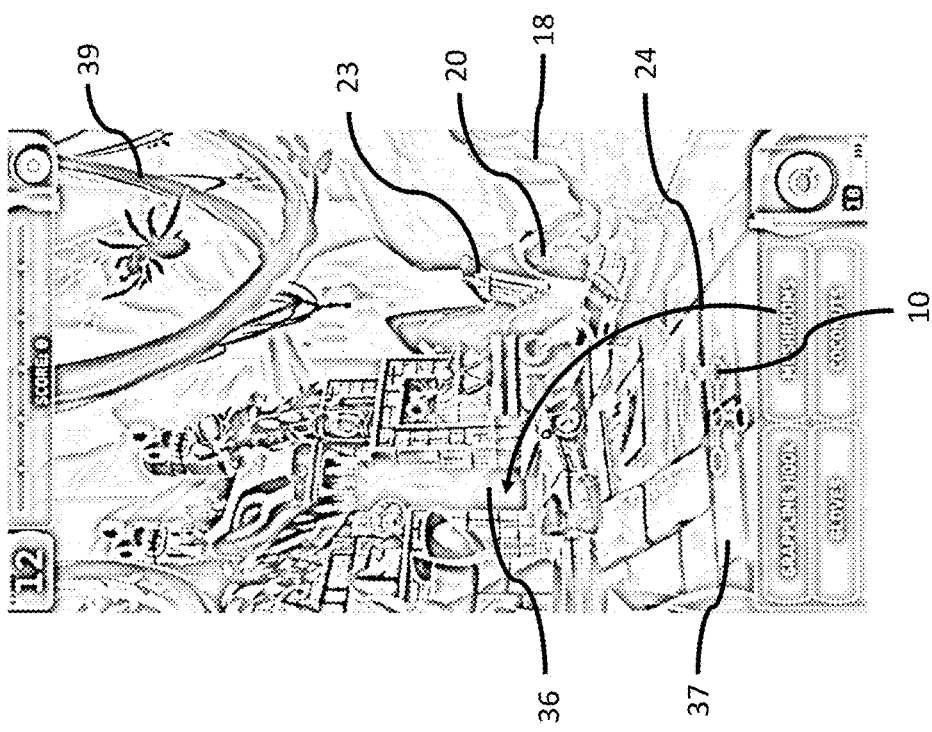
Figure 4C:
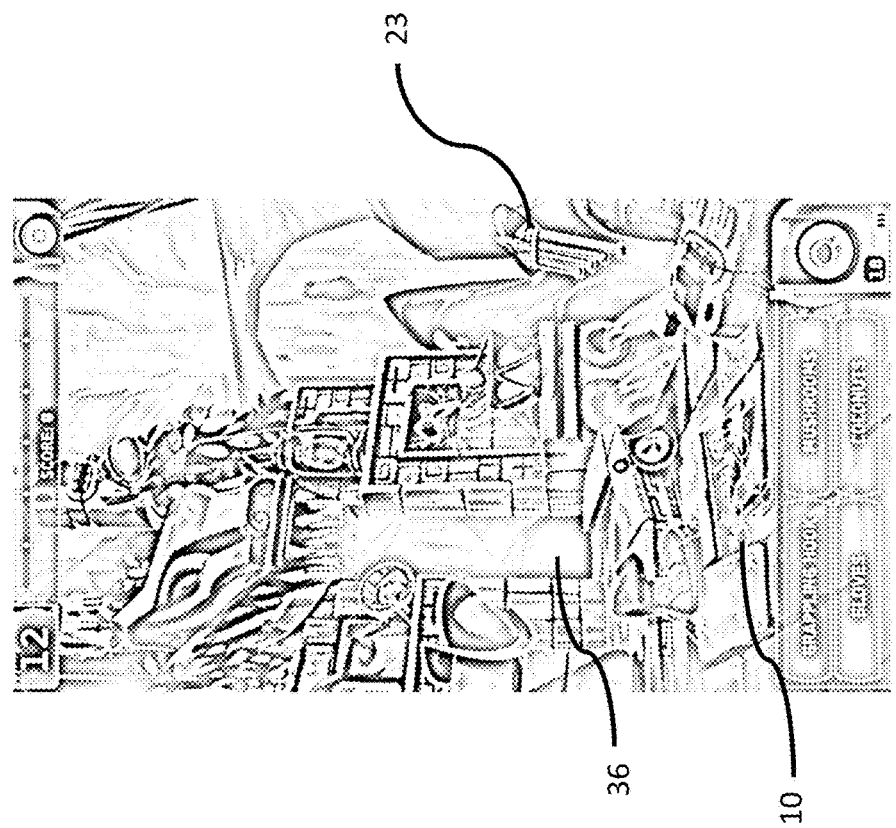

As can be seen from a comparison of the images shown in FIGS. 4a to 4c, as the user progresses, foreground items from one scene do not appear in the next scene and so on. For example, the paving stones 37 and first rock 18 are not present in the successive image. The second rock 20 is present in the first and second images but not in the third image. Likewise, the overhanging branch 39 present in FIG. 4a is only partially present in FIG. 4b and not in FIG. 4c. The opening 36 and pan pipes 23 are in each image. It should be appreciated that the size of the elements which remain in the image will be larger in the successive displayed image to reflect that the user is "getting closer" to those objects. The opening 36, thus appears larger in successive images.

Once the user has moved his finger a sufficient amount, the image will jump to the image of the scene which is located behind the opening 36. An example of such a scene is shown in FIG. 5.

Figure 5:
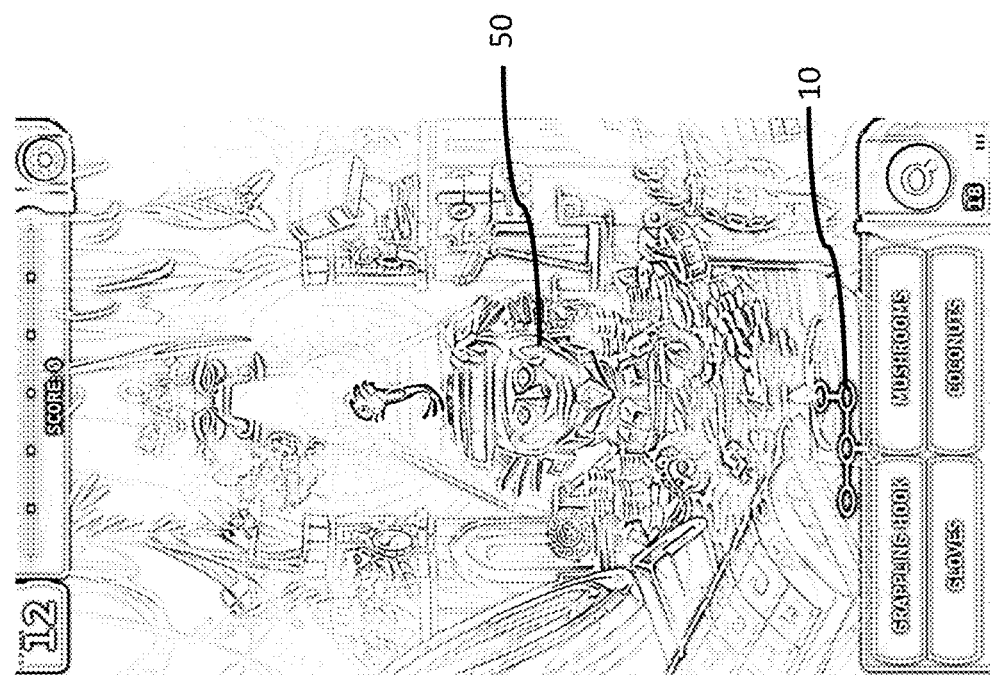
FIG. 5 shows a second scene, accessed from the scene shown in FIG. 4a to c.

It should be appreciated that a reverse process is used for jumping back from the scene shown in FIG. 5 to that shown in FIG. 4. However, in this case as the user moves his finger upward, the distance to the statue object 50 will appear to increase. The statue object 50 in the image will therefore appear smaller in successive images and foreground objects which are not present in the image displayed in FIG. 5 will become visible until the point is reached when the image will switch to that shown in FIG. 4a.

Figure 7:
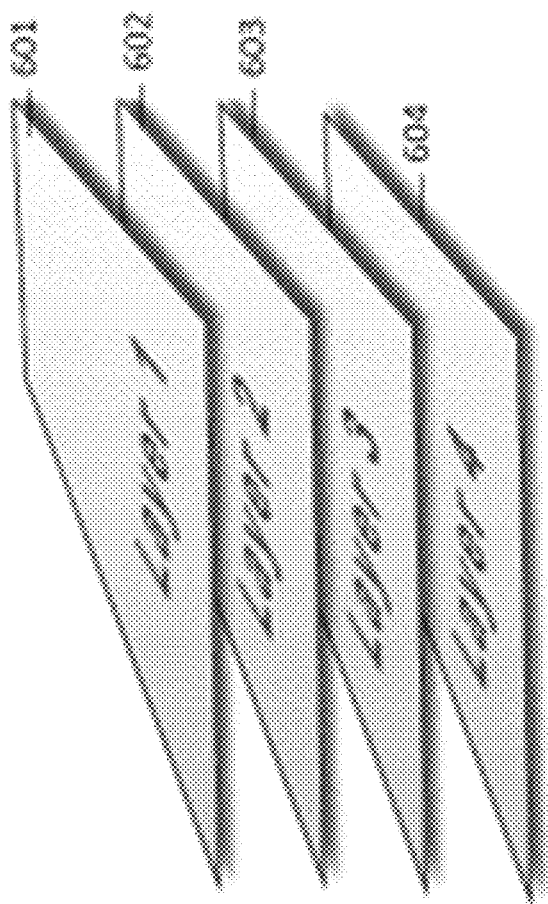
FIG. 7 is a conceptual diagram depicting the view layers of some embodiments.

Reference is made to FIG. 7 shows an example of a four layer display structure used in some embodiments. FIG. 7 comprises a first or top layer 601, a second layer 602, a third layer 603 and a fourth or bottom layer 604. Visual objects in the top layer will be displayed on top of other visual objects in other layers. Visual objects in the second layer will be displayed below visual objects in the top layer, but above any further layers. Visual objects in the third layer will be displayed below visual objects in the top and second layer, but above any further layers. Visual objects in the bottom layer will be displayed below visual objects in all the other layers. It will also be appreciated that four layers is by way of example only and more or fewer layers may be implemented.

Figure 9A:
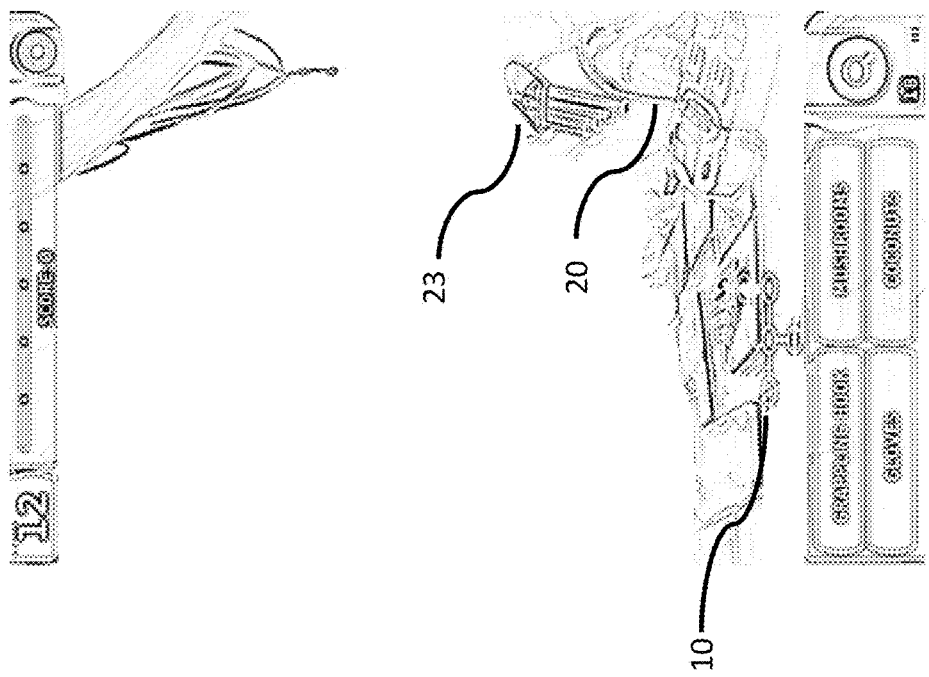
FIGS. 9a to 9c respectively show a foreground image layer, a middle ground image layer and a background image layer associated with the scene of FIGS. 4a to 4c.
Figure 9B:
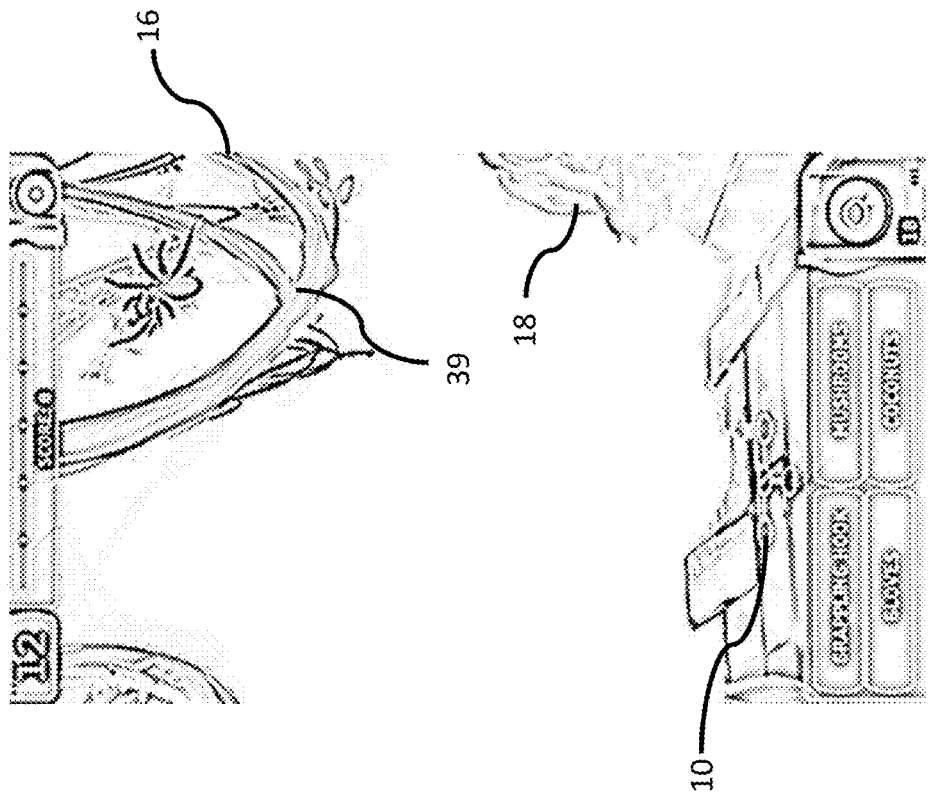
Figure 9C:
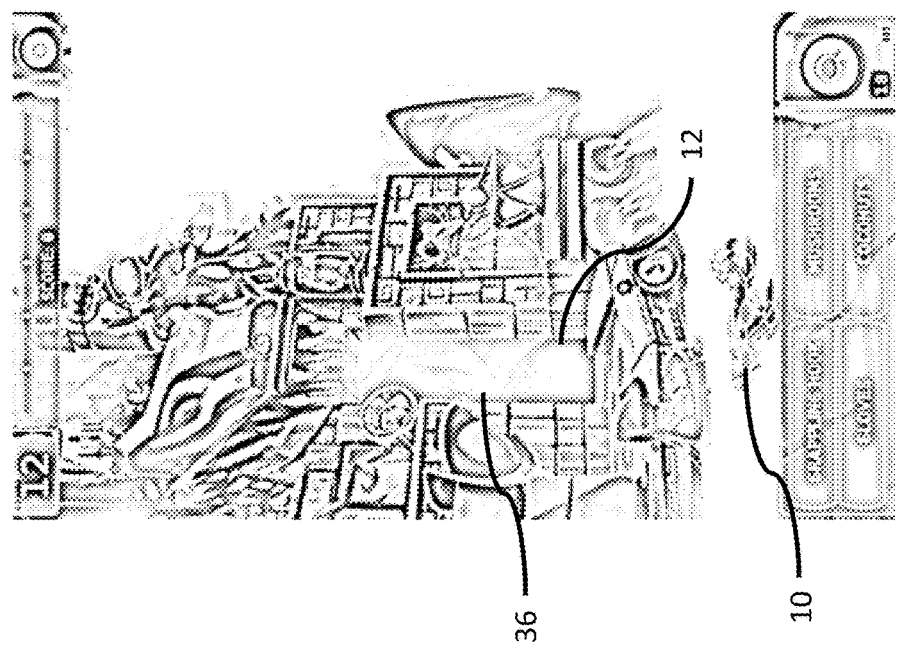

The layered technique of FIG. 7 is used in some embodiments. An example of how this may be implement will now be described with reference to FIGS. 9a to 9c. FIG. 9a shows a foreground layer, FIG. 9b shows a middle ground layer and FIG. 9c showing a background layer. In some embodiments, more than three layers may be provided but to explain the embodiment, reference is made to this arrangement.

Generally, FIG. 4a may be provided by a combination of the first, second and third layers, FIG. 4b may be provided by a combination of the middle and background layers and FIG. 4c may be provided by the background layer.

Referring back to the example shown in FIG. 7, the foreground layer would be the first layer 601 and the background layer 604. When the user moves "into" the image, it is analogous to the user moving through the layers. Once a user has "moved" through a layer, then that layer is not used to create the next displayed image. It should be appreciated that in some embodiments, as the user is 'moving' through the layers, a zooming factor is also being applied so that some of the detail provided around the edge of particular layer may be removed as the user "moves" into the image.

It should be appreciated that in some embodiments, a jump location or the like is provided. When the user reaches this jump location, the image will automatically switch to that of the other scene. The jump location may be associated with one of the layers. For example, the jump location may for example be associated with layer 3 where there is a four layer structure, such as shown in FIG. 7. Once the user has "moved" through the first 2 layers and has reached the 3rd layer, the display may switch to displaying a next scene. In other words, once the layer with the jump location is upper most, the image will switch to that of the other scene. In some embodiments, one of the layers may be the reference and when that layer is uppermost, the image will switch to that of the other scene.

In some embodiments, to provide a more realistic experience, when a user moves "into" a scene, the successive images which are displayed may follow a path so that it looks as if the user is moving along a defined path to the target, for example the opening. In this regard, reference is made to FIGS. 4a to c and the marked arrow referenced 24 shown in FIG. 4a. As can be seen, the arrow follows a curved path from the foreground towards the target opening. As the user "moves" into the image, the graphics engine will render the successive images which are displayed each from the perspective of a successive point on the defined arrow path.

It should be appreciated that in other embodiments, different path shapes to the target may be provided, other than curved.

In some embodiments, reference is made to FIG. 10 which describes a feature used in some embodiments to increase the realism of a scene. For example, going back to the example shown in FIG. 3 and explained with reference to FIG. 10, the image 32 which is displayed is rendered from the viewpoint referenced 62, representing the viewer of the image. The image 32 which is displayed has an object 60 which is positioned near the scene boundary. As the scene moves the rendering of object 60 will change. The object 60 will go from being displayed at an angle to be being displayed square on. The objects are rendered so as to appear three-dimensional. Accordingly, in the case where object 60 is directly in front of the user 62, only the front side of the object is seen. However, in the view shown in when the image 32 fully occupies the display, the object 60 is seen from an angle so part of the front will be seen and part of the side will be seen. In other words, there will be a more perspective view of the object 60. Thus, the rendering which is carried out of out of the object will take into account the relative position between the object on the display and a defined viewpoint. Whilst this has been discussed in relation to a single object, this may be applied to some or all of the objects. It should be appreciated that the rendering takes into account a distance of the object from the point 62, in some embodiments.

Figure 11:
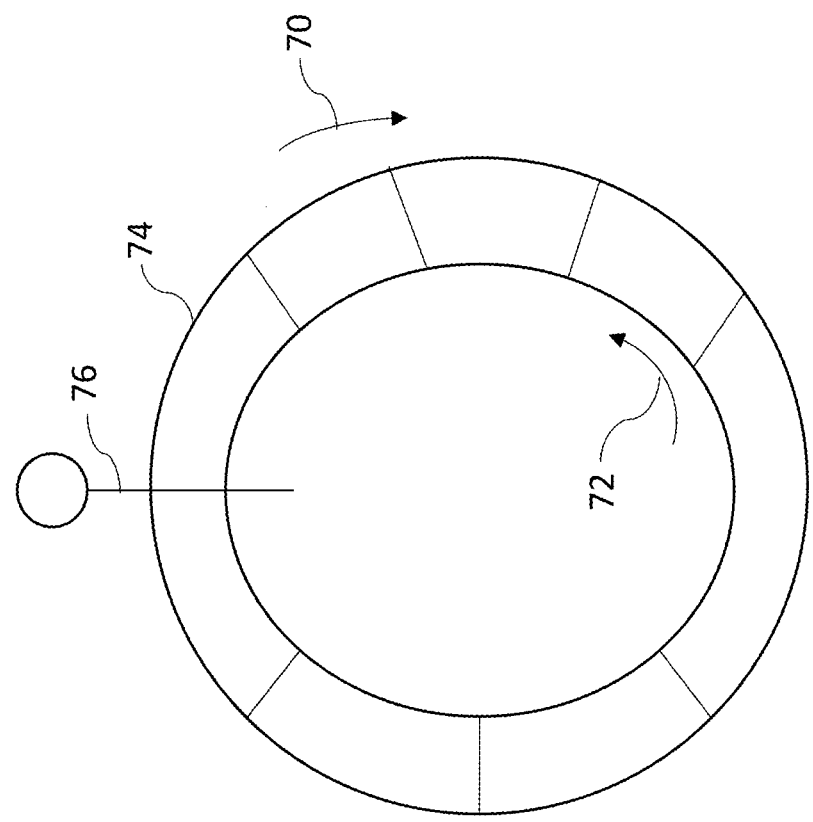
FIG. 11 schematically shows a representation of scoring information used in some embodiments.

Reference is made to FIG. 11 which shows one example of a scoring mechanism which can be used in some embodiments. In some embodiments, as a user achieves game objectives, a ring which is shown will fill up in the direction of arrow 70 from the start point referenced 76. However, the score is being decreased in the direction of arrow 72 as time elapses. In some embodiments, the bar works in discrete levels when incrementing the score but decrements the score in a gradual manner. Accordingly, when the user achieves the next objective, the score will be taken up at least one full level. For example, if the progress bar is between the first and second levels, when the user achieves the next goal, the score bar will fill up to the third level.

Figure 12:
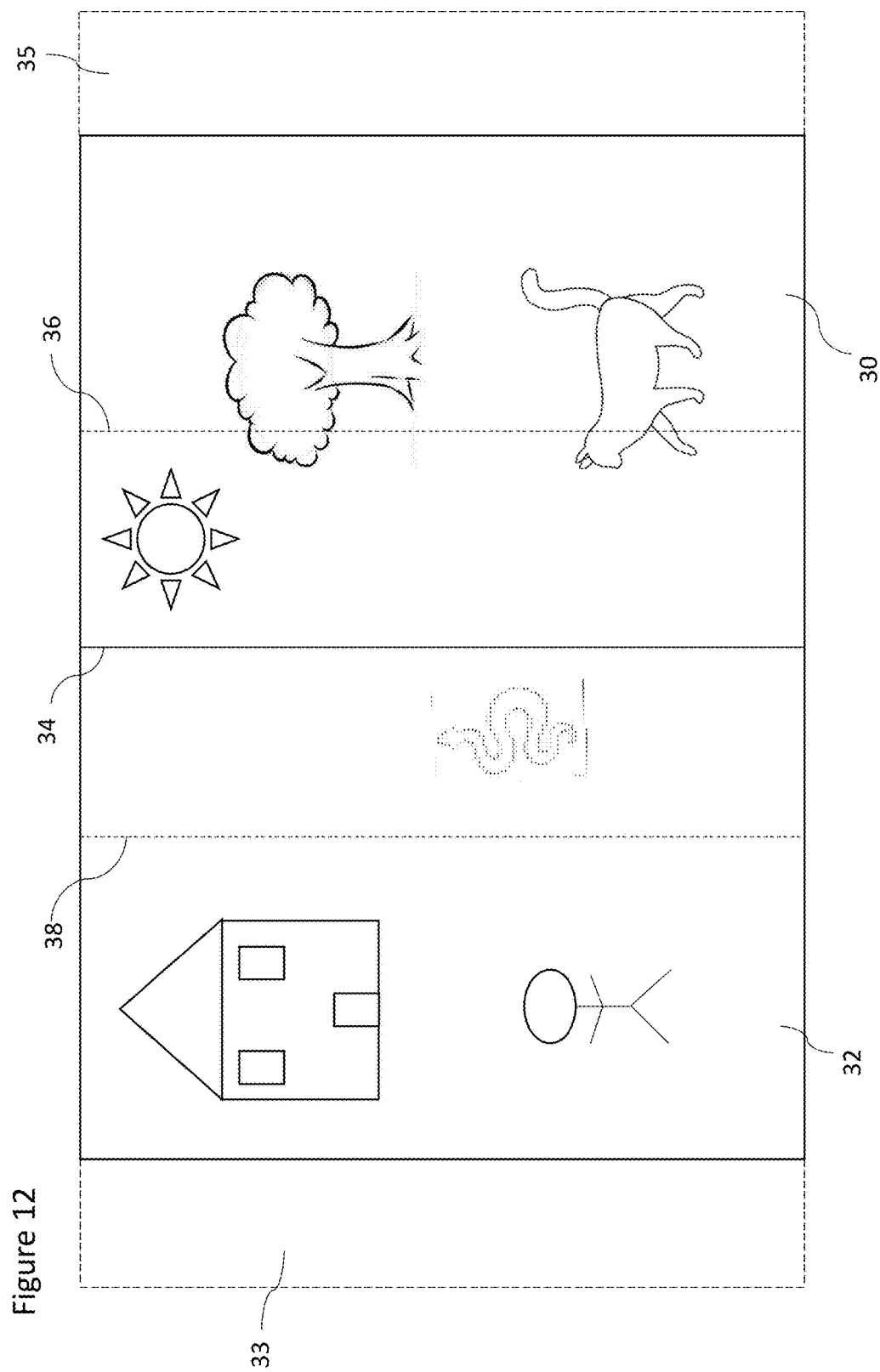
FIG. 12 schematically shows a modification to the images shown in FIG. 3, illustrating prevention of illegal movement.

Reference is made to FIG. 12 which shows a modification to the arrangement described in relation to FIG. 3. With the arrangement of FIG. 3, it is described that the user is able to cause the image to transition from the first image 32 to the second image 30 when the user moves their finger from right to left across the display. This is a so-called "valid" or "legal" move. In some embodiments, when the first image 32 is being displayed, the user may attempt to move their finger in the direction of left to right. This will cause the first image 32 to move towards the right displaying an edge region referenced 33. That edge region 33 is on the left of the first image. When that edge region is displayed further movement in the direction of left to right will result in no further change to the displayed image comprising the edge region 33 and most of the first image. When the user input ends, the image which is displayed is just the first image. In this way, the user will get feedback that moving in the direction of left to right in an "invalid" or "illegal". Likewise an edge region 35 is provided adjacent the second image to the right thereof. In some embodiments, an edge region may be provided on one more of the upper and lower edges of an image in the case that that movement in that direction represents an illegal move.

Figure 13:
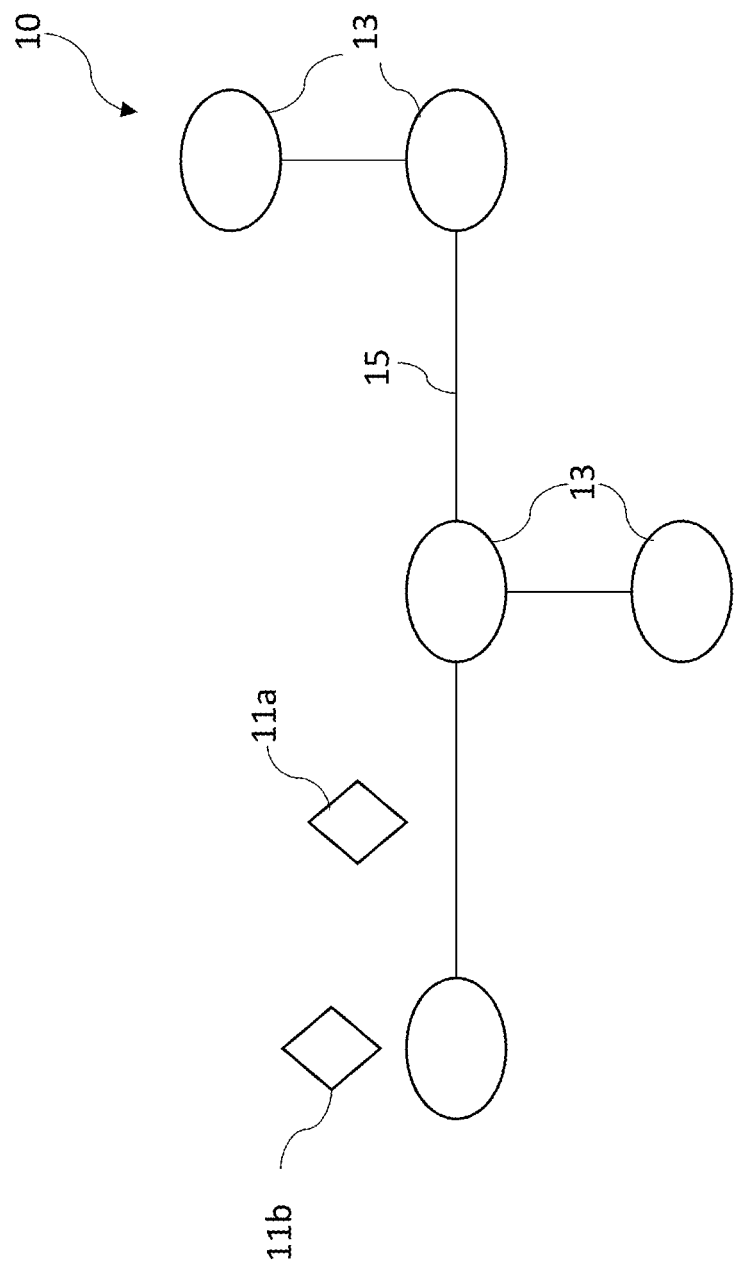
FIG. 13 schematically shows an icon indication a position.

It should be appreciated that in some embodiments, an icon or map 10 is provided. This icon can be seen in FIGS. 4a to c, 5, 6a to c and 9a to c. This icon is shown on its own in FIG. 13 for clarity. The icon comprises a series of circles 13 linked together. Each circle 13 represents a particular scene or image and the position of the circles with respect to each other reflects the relationship between the scenes or images. Of course different shapes or visual representations may be used to represent a scene or image. The links 15 between the circles indicates that the scenes can be accessed one from the other. The direction of the links indicates the direction in which a user needs to move his finger in order to access an adjacent scene. Again any other suitable visual representation of the links between the images or scenes may be provided. Additionally, a pointer 11 or other visual indicator may optionally be provided. For example, there may be a highlighted portion on the icon which will indicate the location of the user. The pointer 11 or other visual indication will indicate the location of the user with respect to the scenes, either in which scene or between which scenes. Where the user is moving his finger to move between images, the pointer may be provided between the two circles representing the respective scenes, for example as shown in FIG. 6b. An example of the position of the pointer in such a scenario is referenced 11a.

Data defining the icon or map may be stored in memory. The processor may be configured to determine the position of the user to control the position of the pointer or other visual indicator with respect to the icon or map.

It should be appreciated that the icon or map 10 may be used to provide visual feedback for the illegal/legal moves. When the user makes a legal move, the pointer or other visual pointer will move, in accordance with the data representing the user input. On the other hand when the user makes an illegal move, such as described with reference to FIG. 12, the pointer or other visual indicator will not move. The determining of whether a move is a legal or illegal move is performed by the processor. Thus the pointer reference 11b will not move if the user attempts to move in the left hand direction.

In the above described embodiments, interaction with the user interface has been described as interaction of a finger with a touchscreen. It should be appreciated that in some embodiments, where a touch screen is used, a stylus or similar implement may be used to interact with the touch screen.

It should be appreciated that embodiments are not limited to touch screen devices. In some embodiments, the user interface may be provided by for example a pointer device.

In the various examples, it has been described that there are two different scenes, side by side, with a user moving between those scenes such as shown in FIG. 6. It should be appreciated that in other embodiments, the scene may be a shared scene. Accordingly, the user can switch between the left-hand half of this scene and the right hand side of this scene such as shown in FIG. 3. In some embodiments, a vertical movement may be used to move between images of a scene. In some embodiments, at least one image can be accessed via a vertical movement and at least one image can be accessed by a left/right movement. The images may be in the same or different scenes.

Some embodiments have been described have been in relation to moving between two images. It should be appreciated that in other embodiments, movement may be between more than two images.

In some embodiments, the controlling of the image which is displayed may be done by the at least one processor. This may be responsive to the detected user input.

Various methods and devices have been described. It should be appreciated that these methods may be implemented in apparatus or devices comprising any suitable circuitry. Some embodiments may be implemented by at least one memory and at least one processor. The memory is provided by memory circuitry and the processor is provided by processor circuitry. Some embodiments may be provided by a computer program running on the at least one processor. The computer program may comprise computer implemented instructions which are stored in the at least one memory and which may be run on the at least one processor. A computer program product may be provided which comprises computer program product comprising code embodied on a computer-readable medium which is configured to be executed on a processor of the computer or user device. In some embodiments, a non-transitory computer readable storage device may be provided to store program code instructions that, when executed by at least one processor causes any of the above described methods to be performed.

A person skilled in the art will realise that the different approaches to implementing the game is not exhaustive, what is described herein are certain preferred embodiments. It is possible to implement the way in a number of variations without departing from the scope of the invention as claimed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A computer device having:
 a display configured to display one of a first part of an image and a second part of the image which together form a continuous scene, only a part of the image being displayable on the display at a given time;
 a user interface configured to receive a user input and provide data representing the user input; and
 at least one processor configured to:
  receive data representing the user input;
  in response to receiving the data representing the user input cause the display to transition from displaying the one of the first part of the image and the second part of the image of the scene to displaying the other of the first part of the image and the second part of the image of the scene, such that when the transition is being made, a part of the first part of the image and a part of the second part of the image are displayed at the same time on said display;

determine that there is no longer a user input being received by the user input;

in response to thereto, when the transition has not been completed, determine which of the first part and the second part of the image is to be displayed, wherein the determination is based on a position of a boundary line relative to a first notional line and a second notional line, the boundary line being associated with a boundary between the first and second part of the image, the boundary line and the notional lines not being displayed on the display, the first and second notional lines being defined with respect to the display; and cause the display to display the determined one of the first part of the image and the second part of the image.

2. The computer device as claimed in claim 1, wherein the at least one processor is configured in the determining which of the first part and the second part of the image is to be displayed, to determine if a condition has been met, and if so to cause one of the first part and the second part of the image to be displayed.

3. The computer device as claimed in claim 2, wherein the condition comprises one or more of:

the data representing the user input indicates that the user input comprises a movement greater or less than a given amount; and more of one of the first and second parts of the image is displayed than the other of the first and second parts of the image.

4. The computer device as claimed in claim 1, wherein the display and the user interface are provided by a touch screen, wherein user input is provided by contact with the touch screen.

5. The computer device as claimed in claim 4, wherein the at least one processor is configured to, in response to a movement in a direction across the display to cause the image displayed on the display to transition in the direction.

6. The computer device as claimed in claim 1, wherein during the transition, the at least one processor is configured to cause the display to display decreasing proportions of the first part of the image and increasing proportions of the second part of the image.

7. The computer device as claimed in claim 1, wherein the at least one processor is configured to render at least one or more objects in at least one of the first part and the second part of the image from a view point, such that the rendering of a respective object changes during the transition.

8. A computer device having:

a display configured to display an image;

a user interface configured to receive a given user input and provide data representing the given user input; and at least one processor configured to:

receive data representing the given user input;

in response to receiving the data representing the given user input cause the display, which is displaying a first image of a first scene having a target when the given user input is received to:

sequentially display a plurality of successive images of the first scene dependent on the first image, the sequence of successive images being such that the target appears to be getting closer in the first scene; and then cause the display to display a second image of a second scene, not dependent on the first image, the second scene representing a scene on an other side of the target to the first scene, wherein the first image and the at least one successive image dependent on the first image comprise the target and a path to the target, at least one processor being configured to render the at least one successive images dependent on the first image from a view point with respect to the path.

9. The computer device as claimed in claim 8, wherein the at least one processor is configured to cause an image to be generated based on a plurality of image layers, a first layer being a foreground layer and a second layer being a background layer, at least one further intermediate layer being provided between the first and second layers.

10. The computer device as claimed in claim 9, wherein the at least one processor is configured to generate the first image using all of the layers, and to generate at least one of the successive images dependent on the first image using some but not all of the layers.

11. The computer device as claimed in claim 9, wherein one of the layers is provided with a reference, such that when the layer with the reference is uppermost in the image, the processor is configured to then cause the second image to be displayed by the display.

12. The computer device as claimed in claim 8, wherein the at least one processor is configured to cause at least one successive images dependent on the first image with at least one object to be displayed, the at least one object being enlarged in at least one successive image compared to a previous image, the previous image being one of the first image and one of the at least one successive images.

13. The computer device as claimed in claim 8, wherein the display and the user interface comprise a touch screen, and the given user input comprises a touch input on the touch screen, said user input having a direction with respect to the display.

14. A computer implemented method comprising:

displaying by a display one of a first part of an image and a second part of the image which together form a continuous scene, only a part of the image being displayable on the display at a given time;

receiving user input by a user interface and providing data representing the input; and receiving data by at least one processor representing the user input;

in response to receiving the data representing the user input, causing the display to transition from displaying the one of the first part of the image and the second part of the image of the scene to displaying the other of the first part of the image and the second part of the image of the scene, such that when the transition is being made, a part of the first part of the image and a part of the second part of the image are displayed at the same time on the display;

determining that there is no longer a user input being received by the user input;

in response to thereto, when the transition has not been completed, determining which of the first part and the second part of the image is to be displayed, wherein the determination is based on a position of a boundary line relative to a first notional line and a second notional line, the boundary line being associated with a boundary between the first and second part of the image, the boundary line and the notional lines not being displayed on the display, the first and second notional lines being defined with respect to the display; and causing the display to display the determined one of the first part of the image and the second part of the image.

15. A computer implemented method comprising:
displaying an image;
receiving a given user input and providing data representing the given user input;
receiving by a processor data representing the given user input;
in response to receiving the data representing the given user input, causing the display, which is displaying a first image of a first scene having a target when the given user input is received to:
   sequentially display a plurality of successive images of the first scene dependent on the first image, the sequence of successive images being such that the target appears to be getting closer in the first scene; and
   then cause the display to display a second image of a second scene, not dependent on the first image, the second scene representing a scene on an other side of the target to the first scene,
wherein the first image and the at least one successive image dependent on the first image comprise the target and a path to the target, the method comprising rendering the at least one successive image dependent on the first image from a view point with respect to the path.

* * * * *